(12) United States Patent
Oaki

(10) Patent No.: US 7,706,623 B2
(45) Date of Patent: Apr. 27, 2010

(54) IMAGE CORRECTING METHOD

(75) Inventor: Junji Oaki, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 1099 days.

(21) Appl. No.: 11/360,581

(22) Filed: Feb. 24, 2006

(65) Prior Publication Data

US 2006/0215899 A1    Sep. 28, 2006

(30) Foreign Application Priority Data

Mar. 24, 2005    (JP)    ............................. 2005-085215

(51) Int. Cl.
*G06K 9/40* (2006.01)

(52) U.S. Cl. ..................................... 382/254

(58) Field of Classification Search ............. 348/394.1, 348/409.1; 382/254, 283; 703/4, FOR. 802
See application file for complete search history.

(56) References Cited

U.S. PATENT DOCUMENTS

2004/0015464 A1 *  1/2004  Ii et al. ......................... 706/48
2006/0018530 A1    1/2006  Oaki et al.

FOREIGN PATENT DOCUMENTS

| JP | 8-76359 | 3/1996 |
|---|---|---|
| JP | 8-272971 | 10/1996 |
| JP | 10-11583 | 1/1998 |
| JP | 10-96613 | 4/1998 |
| JP | 2000-105832 | 4/2000 |
| JP | 2000-241136 | 9/2000 |
| JP | 2000-348020 | 12/2000 |
| JP | 2001-22941 | 1/2001 |
| JP | 2004-38713 | 2/2004 |
| JP | 2006-30518 | 2/2006 |

OTHER PUBLICATIONS

U.S. Appl. No. 11/567,550, filed Dec. 6, 2006, Oaki.
U.S. Appl. No. 11/567,520, filed Dec. 6, 2006, Oaki.
U.S. Appl. No. 11/386,744, filed Mar. 23, 2006, Sugihara, et al.

* cited by examiner

*Primary Examiner*—Bhavesh M Mehta
*Assistant Examiner*—Gregory F Cunningham
(74) *Attorney, Agent, or Firm*—Oblon, Spivak, McClelland, Maier & Neustadt, L.L.P.

(57) ABSTRACT

In a reticle inspecting apparatus or the like, there is provided an image correcting method which is effective when a rank of a matrix lacks due to continuous equal grayscale values when an image is handled as a matrix. In the image correcting method, a random noise image having fine grayscale is superposed on a pattern image to make a matrix full-rank.

8 Claims, 8 Drawing Sheets

(REFERENCE PATTERN IMAGE)

(PATTERN IMAGE UNDER TEST)

| 250 | 250 | 251 | 250 | 11 | 10 | 10 | 10 |
|-----|-----|-----|-----|----|----|----|----|
| 251 | 250 | 250 | 250 | 10 | 10 | 11 | 10 |
| 250 | 250 | 251 | 250 | 10 | 11 | 10 | 10 |
| 250 | 251 | 250 | 250 | 11 | 10 | 10 | 11 |
| 251 | 250 | 250 | 250 | 11 | 10 | 10 | 10 |
| 250 | 250 | 251 | 250 | 10 | 11 | 10 | 10 |
| 250 | 250 | 250 | 251 | 11 | 10 | 11 | 10 |
| 250 | 251 | 250 | 250 | 10 | 11 | 10 | 11 |
| 251 | 250 | 250 | 251 | 10 | 10 | 10 | 10 |
| 250 | 251 | 250 | 250 | 10 | 10 | 11 | 10 |
| 251 | 250 | 251 | 250 | 10 | 10 | 10 | 11 |

| 250 | 250 | 250 | 250 | 10 | 10 | 10 | 10 |
|-----|-----|-----|-----|----|----|----|----|
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |
| 250 | 250 | 250 | 250 | 10 | 10 | 10 | 10 |

IMAGE CORRECTING METHOD

CROSS-REFERENCE TO RELATED APPLICATION

This application is based upon and claims the benefit of priority from prior Japanese Patent Application No. 2005-085215 filed on Mar. 24, 2005 in Japan, the entire contents of which are incorporated herein by reference.

BACKGROUND OF THE INVENTION

1. Field of the Invention

The present invention relates to an image correcting method. The image correcting method can be used in, for example, a pattern inspection apparatus for inspecting the presence/absence of a defect of a micropattern image formed on a workpiece being tested such as a reticle used in, for example, manufacturing of an LSI.

2. Description of the Related Art

In general, since a lot of cost is required to manufacture an LSI, an increase in yield is inevitably sought. As one factor which decreases a yield, a pattern defect of a reticle used when a micropatterning image is exposed and transferred on a semiconductor wafer by a lithography technique is known. In recent years, with a miniaturization of LSI pattern size, the minimum size of a defect to be detected is also miniaturized. For this reason, a higher precision of a pattern inspection apparatus for inspecting a defect of a reticle is required.

Methods of inspecting the presence/absence of a pattern defect are roughly classified into a method of comparing a die with a die (Die-to-Die comparison) and a method of comparing a die with a database (Die-to-Database comparison). The Die-to-Die comparison (DD comparison) is a method of comparing two dies on a reticle to detect a defect. The Die-to-Database comparison (DB comparison) is a method of comparing a die and a database generated from CAD data for LSI design to detect a defect.

With micropatterning on a reticle, defects such as a pixel positioning error between images to be compared with each other, expansion and contraction and distortion of an image, defects which are small enough to be buried in sensing noise, must be detected. Even in the DD comparison or the DB comparison, alignment and image correction in a sub-pixel unit is very important in a pre-stage executing comparison and inspection of an inspection reference pattern image and a pattern image under test.

Therefore, in the conventional pre-stage in which two images, i.e., an inspection reference pattern image and a pattern image under test are inspected by comparison, after alignment in units of sub-pixels based on bicubic interpolation is performed, a correction of expansion and contraction of an image (see, for example, Japanese Patent Application Laid-Open No. 2000-241136), a distortion correction of an image, a resizing correction, a noise averaging process, and the like are sequentially performed. However, a repetition of these corrections generates an accumulative error and serves as a main factor of deteriorating an image. Furthermore, setting of appropriate values a large number of parameters require for the respective corrections and setting of an appropriate order of the respective corrections are disadvantageously difficult.

BRIEF SUMMARY OF THE INVENTION

There is an image correcting method achieved by integrating alignment and image correction, having less image deterioration and a small number of setting parameters, and based on input/output model identification as effective image correction. For example, an inspection reference pattern image and a pattern image under test are used as input data and output data, respectively, to identify an input/output linear prediction model, and alignment in unit of a sub-pixel and image correction are simultaneously realized. In this case, a relational expression of matrixes is formed from the image data, and simultaneous equations are solved to identify a model parameter. At this time, in DB comparison, equal grayscale values continue in the inspection reference pattern image data (free from minute image sensor noise unlike in DD comparison), and a rank of a coefficient matrix of the simultaneous equations lacks, and it may be impossible to identify the model parameter.

The present invention has been made in consideration of the above circumstances, and has as its object to provide an image correcting method which is effective when a rank of a matrix lacks by continuous equal grayscale values when an image is handled as a matrix in image correction in a pattern inspection apparatus such as a reticle inspecting apparatus.

According to an embodiment of the present invention, there is provided an image correcting method for generating a correction image from pattern images of two types, including: the random noise pattern image generating step of generating a random noise pattern image at least in regions having almost equal grayscale values in the pattern image; and the random noise superposed image generating step of superposing the random noise pattern image at least on the regions having the almost equal gray scale values, and wherein the random noise pattern image has grayscale values which are finer than grayscale values of the pattern image.

According to the embodiment of the present invention, there is provided an image correcting method for generating a correction image from an inspection reference pattern image and a pattern image under test, including: the random noise pattern image generating step of generating a random noise pattern image having grayscale values which are finer than the grayscale values of the inspection reference pattern image; and the random noise superposed image generating step of superposing the random noise pattern image on the inspection reference pattern image.

According to the embodiment of the present invention, there is provided an image correcting method for generating a correction image from an inspection reference pattern image and a pattern image under test, including: the uninspected region setting step of setting uninspected regions in the two pattern images; the minimum grayscale value setting step of setting the grayscale values of the uninspected regions in the two pattern images as minimum calibration values; the random noise pattern image generating step of generating two random noise pattern images having grayscale values which are finer than the grayscale values of the two pattern images; and the random noise superposed image generating step of superposing the two random noise pattern images on the minimum calibration grayscale values in the two pattern images and the set uninspected regions, respectively.

According to the embodiment of the present invention, there is provided an image correcting method for generating a correction image from an inspection reference pattern image and a pattern image under test, including: a random noise pattern image generating step of generating a random noise pattern image in at least a region having almost equal grayscale values in the inspection reference pattern image; a random noise superposed image generating step of superposing the random noise pattern image on at least the region having the almost equal grayscale values, the random noise pattern image having grayscale values which are finer than the grayscale values of the pattern images; a simultaneous equation generating step of generating simultaneous equations which describe an input-output relationship using, as an output, each pixel of the pattern image under test and using, as an input, a linear coupling of a pixel group around each corresponding pixel of the inspection reference pattern image on which the random noise is superposed; the simultaneous equation solving step of solving the simultaneous equations to estimate parameters of the prediction model; and the correction image generating step of generating a correction image by using the estimated parameters.

DETAILED DESCRIPTION OF THE INVENTION

A pattern inspection method according to an embodiment of the present invention will be described below with reference to the drawings.

(Outline of Pattern Inspection Method)

Figure 2:
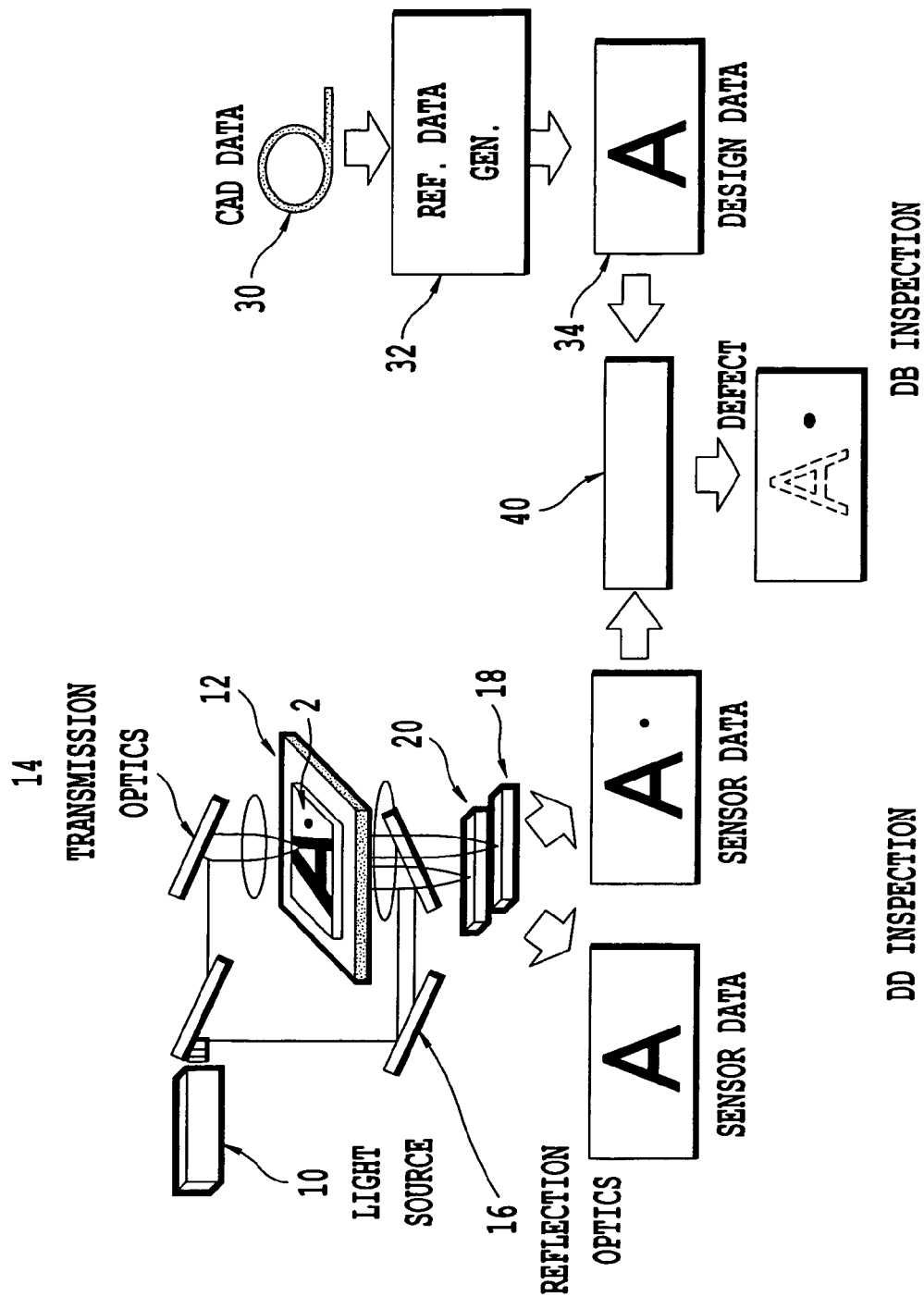
FIG. 2 is a diagram showing the configuration of a concrete example of a pattern inspection apparatus.

A pattern inspection method is performed by using a pattern inspection apparatus. The pattern inspection apparatus is operated by using an irradiating unit for irradiating light on a workpiece being tested and an image acquiring unit for detecting reflected light or transmitted light from the workpiece being tested to acquire a pattern image. A configuration of one concrete example of the pattern inspection apparatus is shown in FIG. 2. A reticle will be described as the workpiece being tested. However, as the workpiece being tested, any sample on which a pattern is formed may be used. A mask, a wafer, and the like maybe used. The pattern inspection apparatus includes: a light source 10 for generating light; a stage 12 on which a reticle 2 is placed; a stage drive system for driving the stage (not shown); a transmission optics (a transmissive optical system) 14 designed to cause light from the light source 10 to transmit through the reticle 2 placed on the stage 12; a reflection optics (a reflective optical system) 16 for irradiating the light from the light source 10 on the reticle 2 placed on the stage 12 to make it possible to detect the reflected light; a transmitted light sensor 18 for detecting transmitted light obtained from the transmission optics 14; and a reflected light sensor 20 for detecting the reflected light from the reflection optics 16. The transmission optics 14 and the reflection optics 16 are constituted by, e.g., a half mirror and a convex lens, respectively. The light irradiating unit includes at least one of the light source 10, the transmission optics 14, and the reflection optics 16. The image acquiring unit includes at least one of the transmitted light sensor 18 and the reflected light sensor 20.

Figure 3:
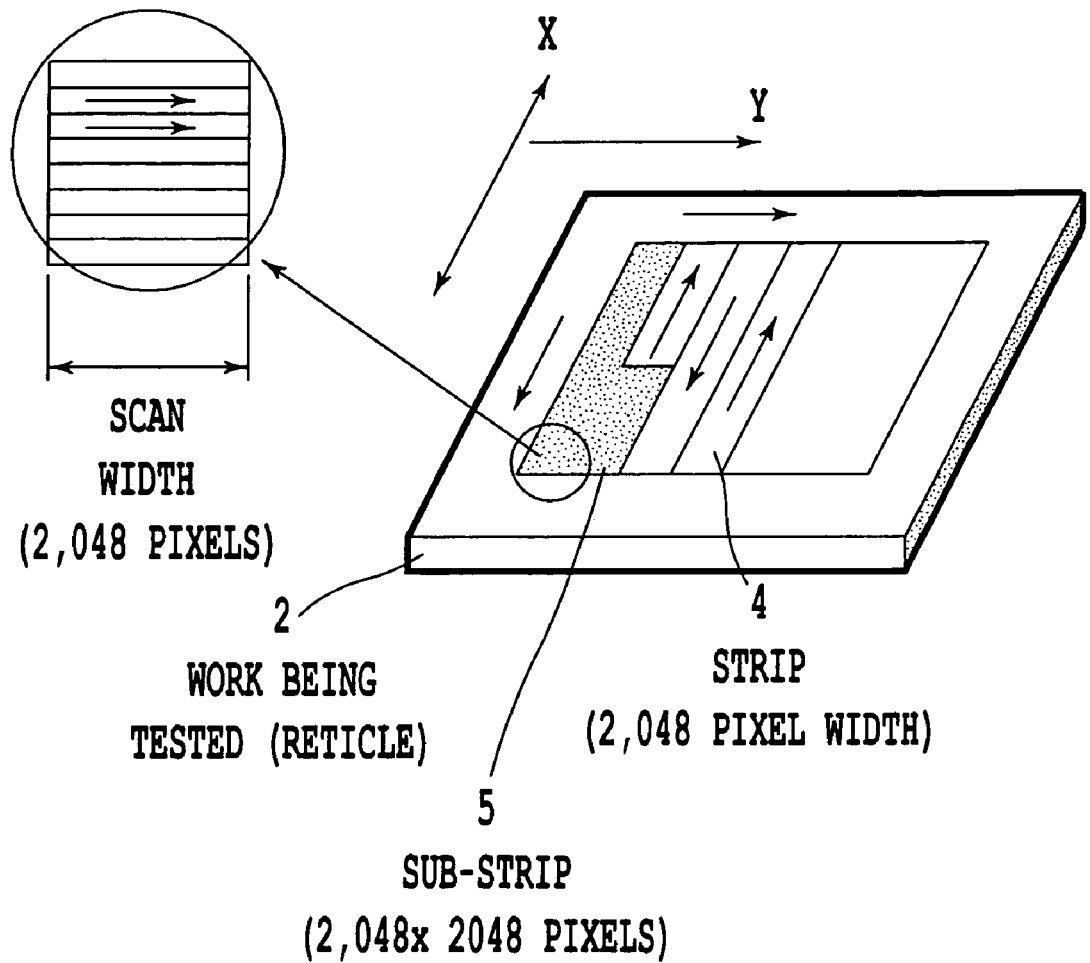
FIG. 3 is a diagram for explaining image acquisition by reticle scanning of a line sensor.

Detailed acquisition of a pattern image drawn on the reticle 2 is performed by scanning the reticle 2 with a line sensor as shown in FIG. 3. In this case, for descriptive convenience, a unit of a strip 4 obtained by cutting the reticle 2 in strips in an X-axis direction shown in FIG. 3 (direction of one side of the reticle 2) is called one strip. A square image 5 obtained by finely cut one strip in a Y-axis direction (direction perpendicular to the X-axis direction) is called one sub-strip. One sub-strip, for example, is defined as 2048×2048 pixels. Inspection of the presence/absence of a defect is performed for every sub-strip. It is assumed that one pixel has 256 grayscales.

The pattern inspection method is performed by comparing pattern images with each other as shown in FIG. 2. As the comparison, comparison between a die and a die or comparison between a die and a database is known. In a die-to-die comparison (DD comparison) method, sensor data, recorded by the transmitted light sensor 18 or the reflected light sensor 20 using at least one of transmitted light and reflected light, of two dies on the reticle 2 are compared with each other by a conparator 40. In this manner, a defect is detected. In a die-to-database comparison (DB comparison) method, a sensor data, recorded by the transmitted light sensor 18 or the reflected light sensor 20 using at least one of transmitted light and reflected light on one die on the reticle 2 and design data 34 generated from a reference data generator circuit 32 based on CAD data 30 for designing an LSI are compared with each other by the comparator 40. In this manner, a defect is detected.

The pattern inspection method used in the embodiment is to break through the limit of a direct comparison method. In the pattern inspection method, as shown in FIG. 1B, during inspection of a relationship between an inspection reference pattern image and a pattern image under test (an under-test pattern image), the image under test is identified online by using a linear prediction model, e.g., a two-dimensional linear prediction model to construct a prediction model which fits a pixel positional error, expansion/contraction noise, or sensing noise. A correction image is generated from the prediction model. The correction image and the pattern image under test are compared with each other. Based on the comparison result, a defect on the pattern image under test is detected.

(Setting of Two-Dimensional Linear Prediction Model (Simultaneous Equation Generating Step))

First, a method of setting a two-dimensional prediction model (two-dimensional input/output linear prediction model) by regarding an inspection reference pattern image as two-dimensional input data and regarding a pattern image under test as two-dimensional output data will be described below. In this case, a 5×5 two-dimensional linear prediction model using a 5×5-pixel region will be exemplified. A suffix (corresponding to a position of 5×5 pixels) used in the model is shown in Table 1. In FIG. 1, the left images are defined as inspection reference patterns, and the right images are defined as images under test. The two-dimensional linear prediction model is a linear prediction model when input and output data are handled as two-dimensional data.

TABLE 1

|   | 0 | 1 | 2 | 3 | 4 |
|---|---|---|---|---|---|
| 0 | i − 2, j − 2 | i − 2, j − 1 | i − 2, j | i − 2, j + 1 | i − 2, j + 2 |
| 1 | i − 1, j − 2 | i − 1, j − 1 | i − 1, j | i − 1, j + 1 | i − 1, j + 2 |
| 2 | i, j − 2 | i, j − 1 | i, j | i, j + 1 | i, j + 2 |
| 3 | i + 1, j − 2 | i + 1, j − 1 | i + 1, j | i + 1, j + 1 | i + 1, j + 2 |
| 4 | i + 2, j − 2 | i + 2, j − 1 | i + 2, j | i + 2, j + 1 | i + 2, j + 2 |

The two-dimensional input data and the two-dimensional output data are defined as u(i,j) and y(i,j) Suffixes of an interested pixel are represented by i and j. Suffixes of total of 25 pixels on about two rows and about two columns surrounding the pixel are set as in Table 1. With respect to pixel data of one pair of 5×5 regions, a relational expression as shown in Equation (1) is set. Coefficients $b_{00}$ to $b_{44}$ of input data u(i,j) of Equation (1) are model parameters to be identified.

[Equation 1]

$$\begin{aligned}y_k &= y(i, j) \\ &= b_{00}u(i-2, j-2) + b_{01}u(i-2, j-1) + b_{02}u(i-2, j) + \\ &\quad b_{03}u(i-2, j+1) + b_{04}u(i-2, j+2) + \\ &\quad b_{10}u(i-1, j-2) + b_{11}u(i-1, j-1) + b_{12}u(i-1, j) + \\ &\quad b_{13}u(i-1, j+1) + b_{14}u(i-1, j+2) + \\ &\quad b_{20}u(i, j-2) + b_{21}u(i, j-1) + b_{22}u(i, j) + b_{23}u(i, j+1) + \\ &\quad b_{24}u(i, j+2) + \\ &\quad b_{30}u(i+1, j-2) + b_{31}u(i+1, j-1) + b_{32}u(i+1, j) + \\ &\quad b_{33}u(i+1, j+1) + b_{34}u(i+1, j+2) + \\ &\quad b_{40}u(i+2, j-2) + b_{41}u(i+2, j-1) + b_{42}u(i+2, j) + \\ &\quad b_{43}u(i+2, j+1) + b_{44}u(i+2, j+2) + \\ &\quad \varepsilon(i, j)\end{aligned} \quad (1)$$

Figure 1A:
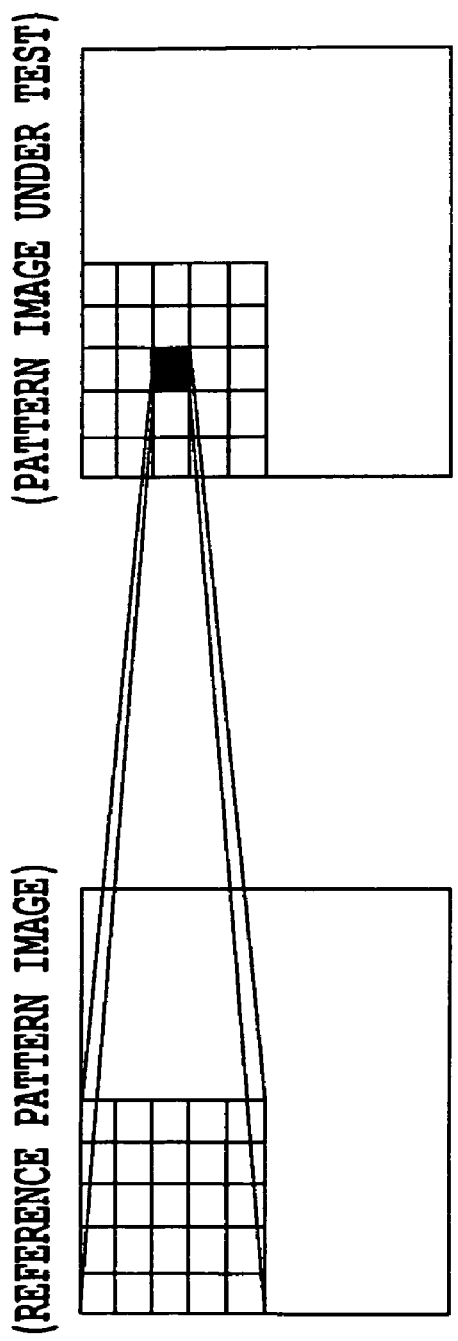
FIGS. 1A and 1B are schematic views of a two-dimensional linear prediction model used in a pattern image inspection method.
Figure 1B:
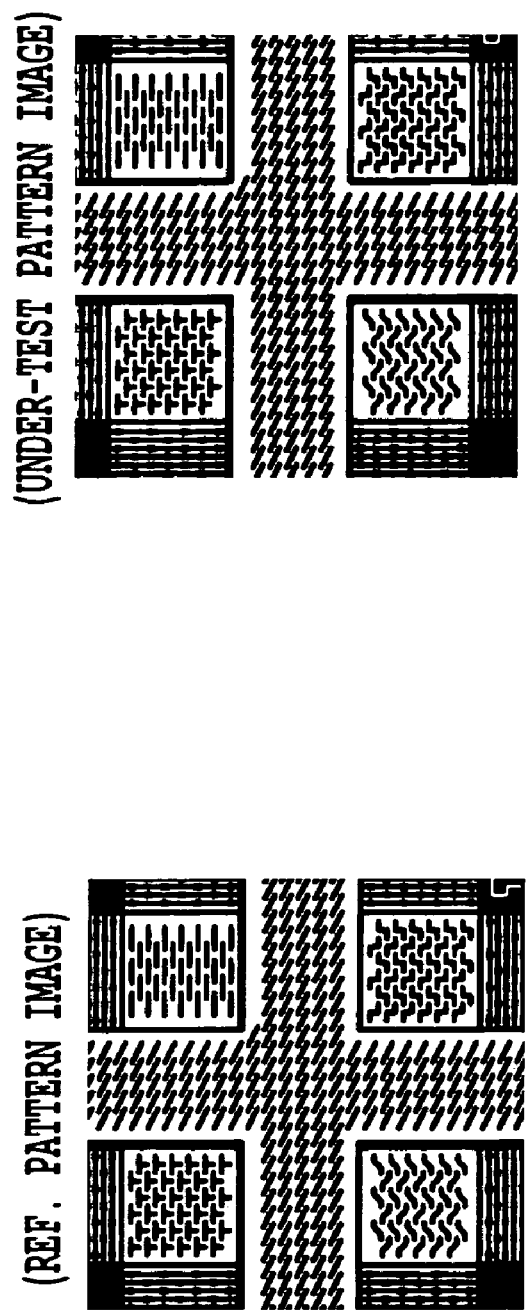

Equation (1) means that data $y_k = y(i,j)$ of a certain pixel of a pattern image under test can be expressed by a linear coupling of data of 5×5 pixels surrounding one pixel of the corresponding inspection reference pattern image (see FIG. 1A). In this case, the statistical characteristics of a residual $\varepsilon$ in Equation (1) are not apparent, and a parameter identification result obtained by the least-square method, to be described later, may have a bias. However, in the embodiment of the present invention, the fitting itself of input/output data obtained by Equation 1 is significant, and the value of the parameter is not directly used. For this reason, the residual $\varepsilon$ does not cause any trouble.

(Simultaneous Equation Solving Step (Identification of Model Parameter))

When Equation (1) is expressed by a vector, Equation (2) is obtained. In this equation, an unknown parameter $\alpha$ is given by $\alpha = [b_{00}, b_{01}, \ldots, b_{44}]^T$, and data vector $x_k$ is given by $x_k = [u(i-2, j-2), u(i-2, j-1), \ldots, u(i+2, j+2)]^T$.

[Equation 2]

$$x_k^T \alpha = y_k \quad (2)$$

Coordinates i and j of the inspection reference pattern image and a pattern image under test are scanned to fetch data of pixels of the coordinates i and j, 25 sets of data are simultaneously established, and a model parameter can be identified. In fact, from a statistical viewpoint, as shown in Equation (3), n (>25) sets of data are prepared, and 25-dimensional simultaneous equations are solved based on the least-square method to identify $\alpha$. In this case, $A = [x_1, x_2, \ldots, x_n]^T$, $y = [y_1, y_2, \ldots, y_n]^T$, $x_k^T \alpha = y_k$, and k = 1, 2, …, n.

[Equation 3]

$$\begin{bmatrix} x_1^T \\ \vdots \\ x_n^T \end{bmatrix} \alpha = \begin{bmatrix} y_1 \\ \vdots \\ y_n \end{bmatrix} \Rightarrow A\alpha = y \Rightarrow \alpha = (A^T A)^{-1} A^T y \quad (3)$$

For example, when each of the inspection reference pattern image and the pattern image under test are constituted by 512×512 pixels, two pixels around each of the images are reduced. For this reason, the number of equations is given by Equation (4), and 258064 data can be obtained. In this manner, the equations the number of which is statistically sufficient can be secured.

[Equation 4]

$$n = (512-4) \times (512-4) = 258064 \quad (4)$$

(Generation of Model Image)

An identified model parameter $\alpha$ and the input/output image data used in identification are assigned to Equation (1), and a simulation operation for scanning the coordinates i and j of the pixels is performed to generate a correction image. In the correction image, as a result of fitting based on the least-square method, reductions of a pixel positional error smaller than one pixel, expansion and contraction, distortion noise, a resizing process, and sensing noise can be realized. In this case, as a matter of course, data used in the simulation includes a defective pixel. However, since the number of defective pixels is considerably smaller than the number of data, the defective pixels are not fitted by the least-square method, and do not appear in the correction image. In addition, since a peripheral S/N ratio is improved, a defective pixel is advantageously emphasized.

(Random Noise Superposed Image Generating Step)

The above is an example in which simultaneous equations are established and solved by using a two-dimensional input/output linear prediction model while handling an image as a matrix. However, in general, when a pattern image includes regions having almost equal grayscale values, and when simultaneous equations are established and solved while handling an image as a matrix, equal grayscale values continue, a rank of a coefficient matrix of the simultaneous equations may lack to make it impossible to identify a model parameter. For example, in DB comparison, equal grayscale values continue in inspection reference pattern image data (free from minute image sensor noise unlike in DD comparison), and a rank of the coefficient matrix of the simultaneous equations lacks, and it may be impossible to identify the model parameter.

As described above, when a rank of the coefficient matrix of simultaneous equations lacks to make it impossible to identify a model parameter, the random noise pattern image is superposed in a region having almost equal grayscale values to make it possible to obtain a full-rank matrix. The random noise pattern image has grayscale values which are finer than the grayscale values of the pattern images, and is generated by the random noise superposed image generating step.

Figures 4A, 4B:
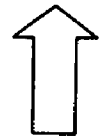
FIGS. 4A and 4B are diagrams showing superposition of a random noise image having fine grayscale values.

In a simple example, inspection reference pattern image data of DB inspection is as shown in FIG. 4A. The maximum grayscale values of 250 continue in the left half of an image (assumed to be calibrated every eight bits within the range of 10 to 250), and the minimum grayscale values of 10 continue in the right half. When the image is considered as a matrix, a rank apparently lacks. Therefore, a two-dimensional binary random noise image is prepared and superposed as shown in FIG. 4B to make it possible to obtain a full-rank matrix. Even in DB inspection, a matrix operation can be executed with the same precision as that in DD inspection.

(Generation of Random Noise Image)

A random noise image may be the M alignment obtained by two-dimensionally arranging the M sequences serving as pseudo random numbers which can be easily generated by a shift register or an image obtained by independently binarizing a sensor image. In this case, it is checked that the number of ranks is sufficient. Since reproducibility is desired for defect inspection for a reticle or the like, it is attended that a reproducible noise source must be used. The above procedures are organized in FIG. 5.

(Image Correcting Method)

Figure 5:
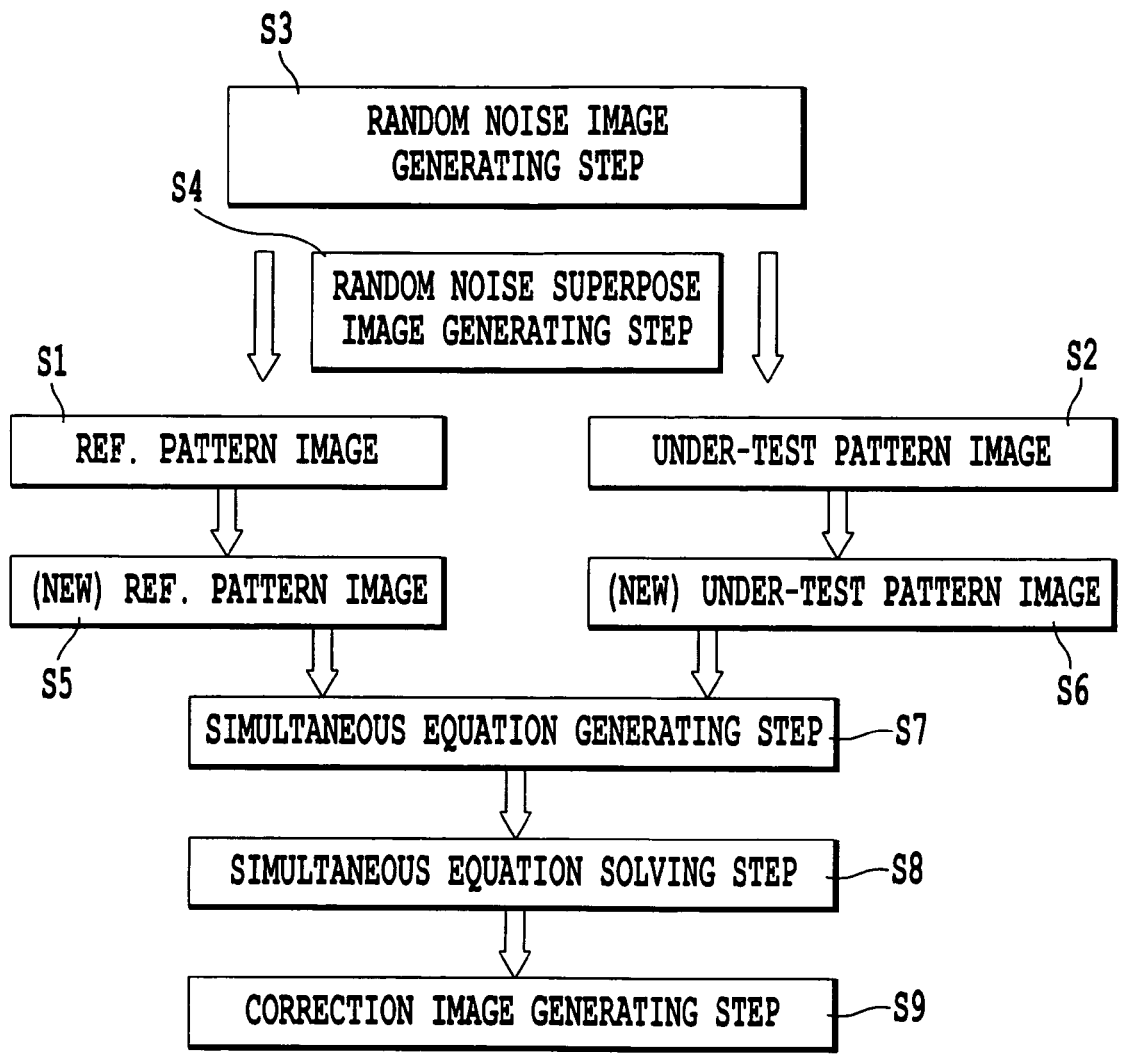
FIG. 5 is a diagram showing steps of an image correcting method.

FIG. 5 shows a procedure of image correction. A random noise image generating step (S3) of generating a random noise image to be superposed on an inspection reference pattern image (S1) and a pattern image under test (S2) is taken, a random noise superposed image generating step (S4) of superposing the random noise image on the pattern images is taken, a (new) inspection reference pattern image (S5) and a (new) pattern image under test (S6) are generated. By using the (new) inspection reference pattern image (S5) and the (new) pattern image under test (S6), the two-dimensional linear prediction model is set. More specifically, simultaneous equations are generated in a simultaneous equation generating step (S7), and the simultaneous equations are solved in a simultaneous equation solving step (S8), so that a model parameter can be identified. A correction image can be generated through a correction image generating step (S9). A difference image between the correction image generated as described above and the pattern image under test is created, and these image patterns are compared with each other to make it possible to easily find a defective portion of the image.

(Setting of Uninspected Region)

Figure 6A:
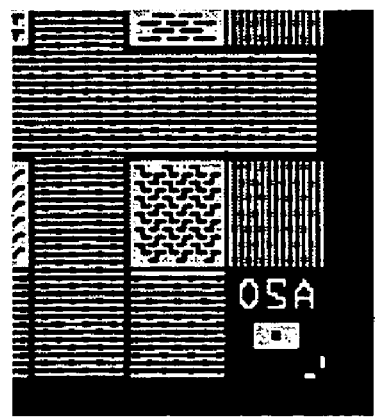
FIGS. 6A, 6B, and 6C are diagrams showing setting of an uninspected region and filling of random noise pattern image data having a fine grayscale.

As another embodiment, an application to a case in which an uninspected region is set will be described below. The uninspected region denotes a region which need not be inspected, i.e., characters "inverted characters of A20" in FIG. 6A.

Figure 6B:
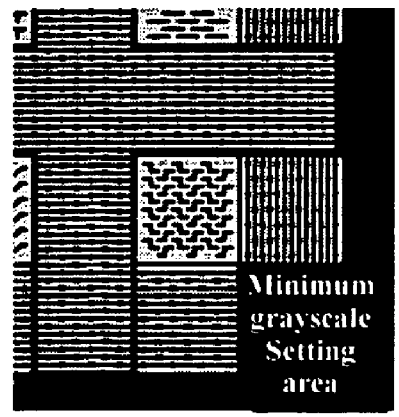
Figure 6C:
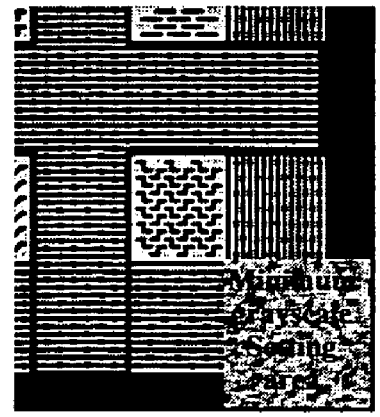

In order to make an image processing procedure equal to an image processing procedure in a case in which there is no uninspected region, it is considered that the minimum grayscale value (10 in the example in FIG. 4) is set in uninspected regions of an inspection reference pattern image and an uninspected pattern image. In this case, an image as shown in FIG. 6B is obtained. In this manner, a rank of a matrix formed from the image data lacks. However, the same random noise image as described in the previous embodiment is superposed to make it possible to make the matrix full-rank. This manner is shown in FIG. 6C.

(Weighted Decomposition of Image)

When a variation (expansion and contraction, distortion, or the like) in an image (for example, 512×512 pixels) is large, the image may not be sufficiently expressed by a 5×5-order linear prediction model. Therefore, in order to expand an expression of the prediction model, an image is decomposed into a plurality of images. First, reference points are set at separated pixel positions in the image, and 5×5-order linear prediction models are set at the reference points, respectively. The pixels of the image are expressed by linear interpolation of prediction models the number of which is equal to the number of reference points. The reference points are preferably set at a peripheral portion where a difference of variation of the image is large. The reference points are, for example, set at four apexes (points A, B, C, and D).

Figure 7:
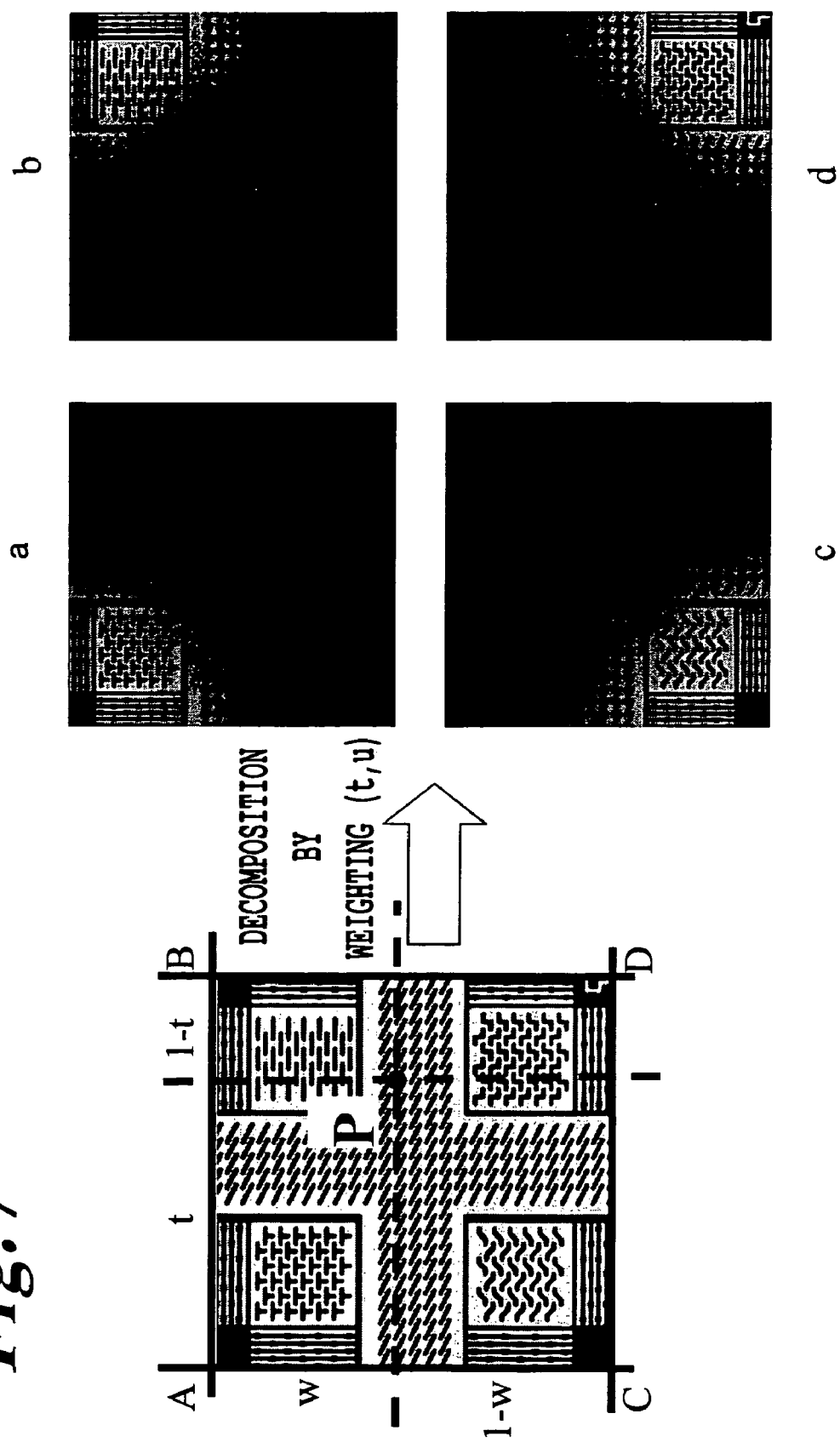
FIG. 7 is a flow chart of an image correcting method.

The 5×5-order linear prediction models are set at the apexes of the image, respectively, and pixels in the image are expressed by linear interpolation of four prediction models. In FIG. 7, an inspection reference pattern image is decomposed into four images (a, b, c, and d) weighted at the apexes (points A, B, C, and D), and one pixel of a corresponding pattern image under test may be expressed by linear coupling of 5×5 pixels near each pixel P of each decomposed image. The pixel P is expressed by a function of linear interpolation parameters t and w in the image as expressed by Equation (5).

[Equation 5]

$$P=(1-t)(1-w)\cdot a+t(1-w)\cdot b+(1-t)w\cdot c+tw\cdot d \quad (5)$$

The number of terms in the right side member in Equation (5), i.e., the number of parameters to be identified is given by 5×5×4=100. For this reason, 100-dimensional simultaneous equations may be solved by the same procedure as that of Equation (1). In fact, from a statistical viewpoint, as in Equation (3), parameters to be identified are calculated based on the least-square method.

With the above procedures, advantages of sub-pixel alignment, expansion and contraction/distortion correction, and resizing correction can be obtained. An S/N ratio can be increased, and a defective portion of an image can be emphasized.

(Procedure of Pattern inspection Method)

Figure 8:
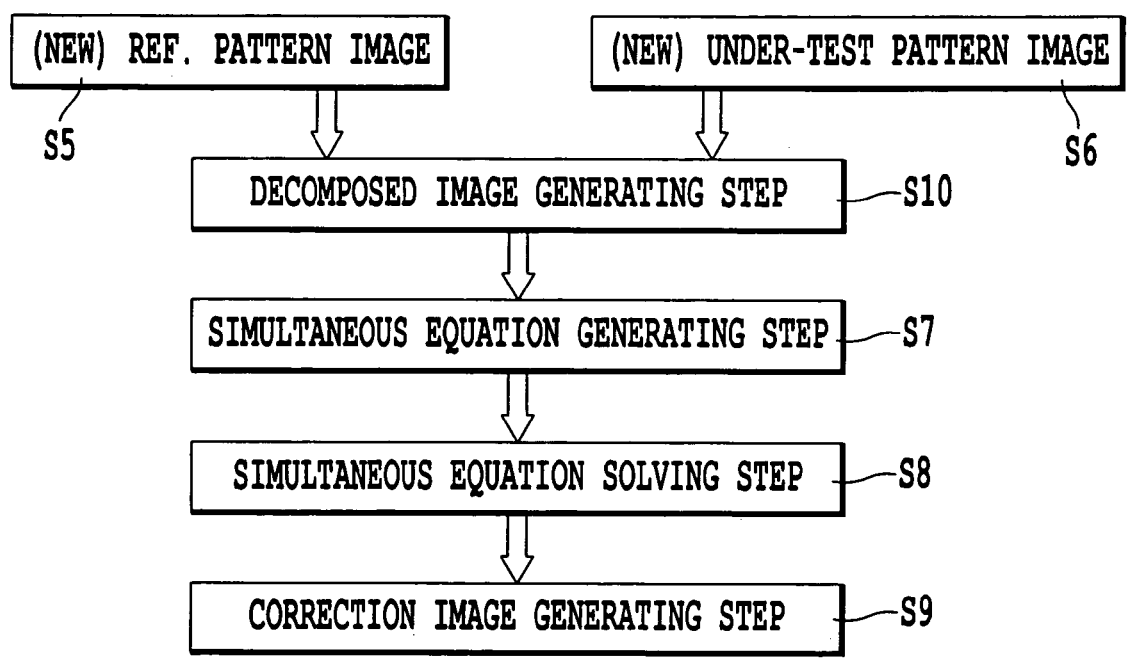
FIG. 8 is a diagram showing steps of an image correcting method using weighted decomposition of one image.

FIG. 8 shows a procedure of a pattern inspection method. A (new) inspection reference pattern image (S5) and a (new) pattern image under test (S6) on which random noise images are superposed are decomposed as shown in FIG. 8 to generate decomposed images (decomposed image generating step S10). Simultaneous equations are generated from the decomposed images as expressed by Equation (5) (simultaneous equation generating step S7). The generated simultaneous equations are solved (simultaneous equation solving step S8). By using the calculated parameters, a correction image is generated (model image generating step S9). As described above, according to the embodiment, an effective image correcting method can be achieved by integrating alignment and image correction and having less image deterioration and a small number of setting parameters. A difference image between the correction image generated as described above and the pattern image under test is created, and these image patterns are compared with each other, so that a defective portion of the image can be easily detected.

As described above, according to the embodiment, in a reticle inspecting apparatus or the like, an image correcting method which is effective when a rank of a matrix lacks due to continuous equal grayscale values when an image is handled as a matrix.

Images are often handled as matrixes. The present invention is not limited to the embodiments described above, as a matter of course.

What is claimed is:

1. An image correcting method for generating a correction image from 1st and 2nd pattern images, said method comprising:

generating a random noise pattern image having grayscale values that are finer than grayscale values of the 1st pattern image;

superposing the random noise pattern image at least on a region of the 1st pattern image having equal grayscale values within the region;

identifying a linear prediction model that describes an input-output relationship of the images by operations of: (1) forming a relational expression of a matrix using the 2nd pattern image as an output, and using the 1st pattern image on which the random noise is superposed as an input, (2) generating simultaneous equations from the matrix, (3) solving the simultaneous equations to estimate parameters of the linear prediction model; and generating a correction image by applying the linear prediction model with the estimated parameters to the 1st pattern image.

2. An image correcting method for generating a correction image from an inspection reference pattern image and a pattern image under test, said method comprising:

generating a random noise pattern image having grayscale values that are finer than grayscale values of the inspection reference pattern image;

superposing the random noise pattern image at least on a region of the inspection reference pattern image having equal grayscale values within the region;

identifying a linear prediction model that describes an input-output relationship of the images by operations of: (1) forming a relational expression of a matrix using the pattern image under test as an output, and using the inspection reference pattern image on which the random noise is superposed as an input, (2) generating simultaneous equations from the matrix, (3) solving the simultaneous equations to estimate parameters of the linear prediction model; and generating a correction image by applying the linear prediction model with the estimated parameters to the inspection reference pattern image.

3. An image correcting method for generating a correction image from an inspection reference pattern image and a pattern image under test, said method comprising:

generating two random noise pattern images having grayscale values that are finer than grayscale values of the inspection reference pattern image and the pattern image under test; and superposing the two random noise pattern images at least on a first region of the inspection reference pattern image having equal grayscale values within the first region and on a second region of the pattern image under test having equal grayscale values within the second region, respectively;

identifying a linear prediction model that describes an input-output relationship of the images by operations of: (1) forming a relational expression of a matrix using the pattern image under test as an output, and using the inspection reference pattern image on which the random noise is superposed as an input, (2) generating simultaneous equations from the matrix, (3) solving the simultaneous equations to estimate parameters of the linear prediction model; and generating a correction image by applying the linear prediction model with the estimated parameters to the inspection reference pattern image.

4. An image correcting method for generating a correction image from an inspection reference pattern image and a pattern image under test, said method comprising:

setting regions within the inspection reference pattern image and the pattern image under test as uninspected regions;

setting minimum grayscale values on the uninspected regions;

generating two random noise pattern images having grayscale values that are finer than grayscale values of the inspection reference pattern image and the pattern image under test;

superposing the two random noise pattern images on the uninspected regions of the inspection reference pattern image and the pattern image under test, respectively;

identifying a linear prediction model that describes an input-output relationship of the images by operations of: (1) forming a relational expression of a matrix using the pattern image under test on which the random noise is superposed as an output, and using the inspection reference pattern image on which the random noise is superposed as an input, (2) generating simultaneous equations from the matrix, (3) solving the simultaneous equations to estimate parameters of the linear prediction model; and generating a correction image by applying the linear prediction model with the estimated parameters to the inspection reference pattern image.

5. An image correcting method for generating a correction image from an inspection reference pattern image and a pattern image under test, said method comprising:

generating a random noise pattern image having grayscale values that are finer than grayscale values of the inspection reference pattern image;

superposing the random noise pattern image at least on a region of the inspection reference pattern image having equal grayscale values within the region;

generating simultaneous equations which describe an input-output relationship using, as an output, each pixel of the pattern image under test and using, as an input, a linear coupling of a pixel group of the reference pattern image on which the random noise is superposed around each pixel corresponding to the each pixel of the pattern image under test of on which the random noise is superposed;

solving the simultaneous equations to estimate parameters of a prediction model; and generating a correction image by using the prediction model with the estimated parameters.

6. The image correcting method according to claim 5, wherein the prediction model is a two-dimensional prediction model using each pixel of the pattern image under test as two-dimensional output data and using a linear coupling of a pixel group around each pixel as two-dimensional input data.

7. The image correcting method according to claim 5, wherein the parameters of the prediction model are estimated by using a least-square method.

8. An image correcting method for generating a correction image from an inspection reference pattern image and a pattern image under test, said method comprising:

generating a random noise pattern image having grayscale values that are finer than grayscale values of the inspection reference pattern image;

superposing the random noise pattern image at least on a region of the inspection reference pattern image having equal grayscale values within the region;

setting reference points at a plurality of separated positions in the inspection reference pattern image on which the random noise is superposed, giving a weight to the inspection reference pattern image on which the random noise is superposed with reference to the reference points, and generating decomposed images the number of which is equal to the number of reference points;

generating simultaneous equations which describe an input-output relationship using each pixel of the pattern image under test on which the random noise is superposed as an output and using a linear coupling of a pixel group of the decomposed image around each pixel corresponding to the each pixel of the pattern image under test as an input;

solving the simultaneous equations to estimate parameters of a prediction model; and generating a correction image by using the prediction model with the estimated parameters.

* * * * *